(12) United States Patent
Li et al.

(10) Patent No.: US 11,894,879 B2
(45) Date of Patent: Feb. 6, 2024

(54) CHANNEL MEASUREMENT METHOD AND APPARATUS, TERMINAL, BASE STATION AND STORAGE MEDIUM

(71) Applicant: BEIJING XIAOMI MOBILE SOFTWARE CO., LTD., Beijing (CN)

(72) Inventors: Yuanyuan Li, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 602 days.

(21) Appl. No.: 17/129,616

(22) Filed: Dec. 21, 2020

(65) Prior Publication Data
US 2021/0111820 A1    Apr. 15, 2021

Related U.S. Application Data

(63) Continuation of application No. PCT/CN2018/092701, filed on Jun. 25, 2018.

(51) Int. Cl.
*H04W 4/40* (2018.01)
*H04B 17/318* (2015.01)
(Continued)

(52) U.S. Cl.
CPC ......... *H04B 17/318* (2015.01); *H04L 5/0053* (2013.01); *H04W 72/0453* (2013.01)

(58) Field of Classification Search
CPC ....... H04B 17/318; H04L 5/0053; H04L 1/08; H04W 24/10; H04W 72/0453; H04W 4/40; H04W 76/15
See application file for complete search history.

(56) References Cited

U.S. PATENT DOCUMENTS

2016/0227427 A1    8/2016  Vajapeyam
2016/0302230 A1   10/2016  Novlan et al.
(Continued)

FOREIGN PATENT DOCUMENTS

CN    106165488 A    11/2016
CN    106664645 A     5/2017
(Continued)

OTHER PUBLICATIONS

English translation of the Written Opinion of the International Search Authority in the international application No. PCT/CN2018/092701, dated Mar. 18, 2019, (4 pages).
(Continued)

*Primary Examiner* — Anez C Ebrahim
(74) *Attorney, Agent, or Firm* — Arch & Lake LLP

(57) ABSTRACT

Methods and apparatuses for channel measurement are provided. A terminal receives received signal strength indicator (RSSI) measurement timing configuration (RMTC) parameters sent by a base station. The RMTC parameters may include indication information of at least one sub-carrier gap and a terminal measurement duration corresponding to the indication information. The different pieces of indication information may correspond to different terminal measurement durations. The terminal may further determine, according to the indication information of the at least one sub-carrier gap and the terminal measurement duration corresponding to the indication information, a target terminal measurement duration corresponding to at
(Continued)

least one target sub-carrier gap to be measured. The terminal may also perform channel measurement according to the target terminal measurement duration.

8 Claims, 4 Drawing Sheets

(51) Int. Cl.
    *H04L 5/00*         (2006.01)
    *H04W 72/0453*    (2023.01)

(56) References Cited

U.S. PATENT DOCUMENTS

| | | | | |
|---|---|---|---|---|
| 2019/0140725 A1* | 5/2019 | Aiba | ................ | H04W 72/0446 |
| 2019/0230574 A1 | 7/2019 | Novlan | | |
| 2019/0327641 A1* | 10/2019 | Mok | ...................... | H04W 4/40 |

FOREIGN PATENT DOCUMENTS

| | | |
|---|---|---|
| CN | 106686604 A | 5/2017 |
| CN | 107404372 A | 11/2017 |
| CN | 107534499 A | 1/2018 |
| EP | 3373628 A1 | 9/2018 |
| WO | 2016013775 A1 | 1/2016 |
| WO | 2017137445 A1 | 8/2017 |

OTHER PUBLICATIONS

Qualcomm Incorporated: "Measurement variation in LAA RSSI measurement on AWGN-like signal", 3GPP Draft; R4-1801981 RSSI Measurement Variation V1, 3rd Generation Partnership Project (3GPP), Mobile Competence Centre; 650, Route Des Lucioles; F-06921 Sophia-Antipolis Cedex France, vol. RAN WG4, No. Athens, Greece; Feb. 26, 2018-Mar. 2, 2018 Feb. 17, 2018 (Feb. 17, 2018), XP051402294, (4 pages).

Supplementary European Search Report in the European application No. 18924892.5, dated Jan. 27, 2022, (10 pages).

Office Action of the Indian application No. 202147001419, dated Jan. 4, 2022, (5 pages).

International Search Report in the International Application No. PCT/CN2018/092701, dated Mar. 18, 2019, (2p).

First Office Action issued to Chinese Application No. 201880000864.X dated Jul. 15, 2020 with English translation, (16p).

ZTE Corporation. "CR for Introducing ss-RSSI-Measurement in SIB24(RIL Z002, Z003, Z004)" 3GPP TSG-RAN WG2 Meeting # AH1807, R2-1810018, Jun. 28, 2018, (4p).

* cited by examiner

CHANNEL MEASUREMENT METHOD AND APPARATUS, TERMINAL, BASE STATION AND STORAGE MEDIUM

CROSS-REFERENCE TO RELATED APPLICATION

This application is a continuation of International Application No. PCT/CN2018/092701, filed on Jun. 25, 2018, the entire contents of which are incorporated herein by reference in its entirety for all purposes.

TECHNICAL FIELD

The present disclosure relates to the technical field of communications, and more particularly, to a method and apparatus for channel measurement, a terminal, a base station, and a storage medium.

BACKGROUND

In a licensed-assisted access (LAA) system, a received signal strength indicator (RSSI) and a channel occupancy rate reported by a terminal usually need to assist a base station in channel selection, and the base station may configure an RSSI measurement timing configuration (RMTC) parameter for terminal measurement, the RMTC parameter including a terminal measurement duration for terminal measurement. For example, the terminal measurement duration may be any value in a terminal measurement duration set {1 orthogonal frequency division multiplexing (OFDM) symbol, 14 OFDM symbols, 28 OFDM symbols, 42 OFDM symbols, 70 OFDM symbols}. The base station sends the configured RMTC parameter to the terminal, and the terminal performs channel measurement according to the RMTC parameter.

However, in the LAA system, a subcarrier spacing is fixed to be 15 kHz, and correspondingly, in a time domain, a length of one OFDM symbol is also fixed. In a new radio access technology (NR) system applied in a 5th-generation (5G) network, a subcarrier spacing may be $\Delta f=2^u*15$ [kHz], where a value of u may be 0, 1, 2, 3 and 4, and for different subcarrier spacings, each OFDM symbol also has different lengths.

Since different subcarrier spacings correspond to different OFDM symbol lengths, in the NR system, if a terminal measurement duration is still configured according to the manner in the LAA system, a terminal may determine terminal measurement durations and sampling points during channel measurement according to a fixed OFDM symbol length under different subcarrier spacings, resulting in deviations of the terminal measurement durations and the sampling points and further resulting in inaccuracy of measurement results.

SUMMARY

In view of this, the present disclosure provides methods and apparatuses for channel measurement.

According to a first aspect of the present disclosure, a method for channel measurement is provided. In the method, a terminal receives an RMTC parameter sent by a base station. The RMTC parameter may include indication information of at least one subcarrier spacing and a terminal measurement duration corresponding to the indication information. The different indication information may correspond to different terminal measurement durations. The terminal may further determine a target terminal measurement duration corresponding to at least one target subcarrier spacing to be measured according to the indication information of the at least one subcarrier spacing and the terminal measurement duration corresponding to the indication information. The terminal may also perform channel measurement according to the target terminal measurement duration.

According to a second aspect of the present disclosure, a method for channel measurement is provided. In the method a base station configures an RMTC parameter for a terminal. The RMTC parameter may include indication information of at least one subcarrier spacing and a terminal measurement duration corresponding to the indication information. The different indication information may correspond to different terminal measurement durations. The base station may send the RMTC parameter to the terminal to cause the terminal to determine a target terminal measurement duration corresponding to at least one target subcarrier spacing to be measured according to the indication information of the at least one subcarrier spacing and the terminal measurement duration corresponding to the indication information and to cause the terminal to perform channel measurement according to the target terminal measurement duration.

According to a third aspect of the present disclosure, a computing device is provided. The computing device may include one or more processors and a non-transitory computer-readable medium storing instructions executable by the one or more processors. The one or more processors may be configured to receive an RMTC parameter sent by a base station. The RMTC parameter may include indication information of at least one subcarrier spacing and a terminal measurement duration corresponding to the indication information. The different indication information may correspond to different terminal measurement durations. The one or more processors may also be configured to determine a target terminal measurement duration corresponding to at least one target subcarrier spacing to be measured according to the indication information of the at least one subcarrier spacing and the terminal measurement duration corresponding to the indication information. The one or more processors may further be configured to perform channel measurement according to the target terminal measurement duration.

According to a fourth aspect of the present disclosure, a computing device is provided and the computing device may include one or more processors and a non-transitory computer-readable medium for storing instructions executable by the one or more processors. The one or more processors may be configured to configure an RMTC parameter for a terminal. The RMTC parameter may include indication information of at least one subcarrier spacing and a terminal measurement duration corresponding to the indication information. The different indication information may correspond to different terminal measurement durations. The one or more processors may further be configured to send the RMTC parameter to the terminal to cause the terminal to determine a target terminal measurement duration corresponding to at least one target subcarrier spacing to be measured according to the indication information of the at least one subcarrier spacing and the terminal measurement duration corresponding to the indication information and to cause the terminal to perform channel measurement according to the target terminal measurement duration.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in the specification and constitute a part of the specification, show embodiments of the present disclosure. The drawings along with the specification explain the principles of the present disclosure.

DETAILED DESCRIPTION

Figure 1:
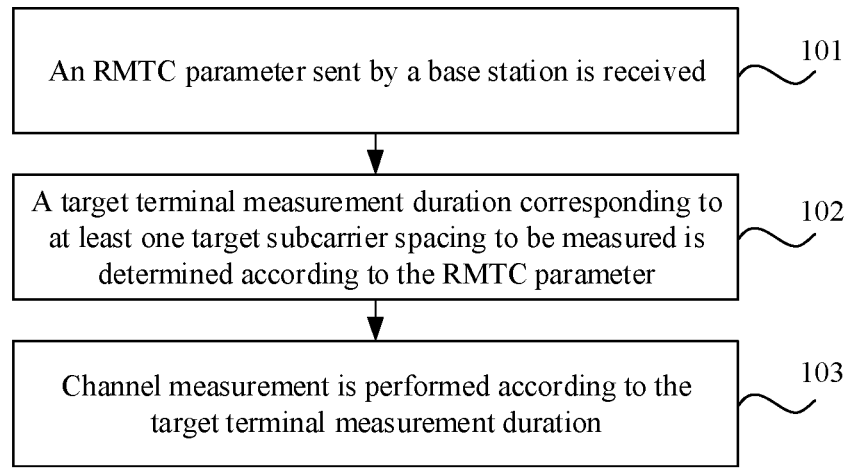
FIG. 1 is a flow chart showing a channel measurement method, according to an example of the present disclosure.

A detailed description will now be made to embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims. It should be understood that the specific implementation modes described here are adopted not to limit the present disclosure but only to describe and explain the present disclosure.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

First of all, one or more application scenarios of the present disclosure is described. Rapid growth of mobile broadband services increases spectrum requirements of cellular networks of operating companies. At present, a main form of using a spectrum in a cellular network is a dedicated spectrum, namely the spectrum is exclusive to a certain network. The exclusive dedicated spectrum is relatively high in efficiency but expensive and limited in total spectrum number. On the other hand, unlicensed spectrums attract more and more attentions of operating companies due to their rich available bandwidths and low license fees.

In some regions, technology application on an unlicensed spectrum needs to follow certain regulations to ensure fair coexistence between the technology and another technology such as wireless fidelity (WiFi), or between networks deployed by different operating companies or different cellular communication systems on the unlicensed spectrum. Therefore, an new radio access technology (NR) system needs to not only meet regulatory requirements but also avoid obvious influences on an existing system to ensure fair coexistence with another technology on an unlicensed spectrum on the premise of meeting the regulatory requirements to avoid channel conflicts.

An existing method for ensuring fair coexistence is called listen before talk (LBT). The method is mainly to perform clear channel assessment before a channel is used, thereby determining whether the channel is idle. For downlink transmission, a base station performs channel selection by use of LBT. However, in such a manner, it may only be ensured that a selected carrier is better for the base station side, while for a terminal served by the base station, the selected target working carrier may be improved because there may be a sending frame conflict for existence of a hidden node (namely two terminals communicating with the base station may not sense each other). Therefore, during channel selection, it is also necessary to combine measurement of a channel parameter by the terminal to eliminate the influence of the hidden node.

The channel parameter may include a received signal strength indicator (RSSI) and a channel occupancy rate. The RSSI reflects a received power level of the terminal on a configured channel. If a value of the RSSI is greater, it is indicated that a load on the measured channel is higher; otherwise it is indicated that the load on the measured channel is lower. The channel occupancy rate represents an average occupation degree of the channel. The terminal, after obtaining the channel parameter, reports the channel parameter to the base station to assist the base station in channel selection.

In an existing licensed-assisted access (LAA) system, for implementing measurement of a channel parameter by a terminal, a base station may configure an RMSI measurement timing configuration (RMTC) parameter for the terminal, and the terminal performs channel measurement according to the configured RMTC parameter. A subcarrier spacing in a frame structure of the LAA system is fixed (15 kHz), and a terminal measurement duration of the terminal and a sampling point in a measurement process are measured by use of the orthogonal frequency division multiplexing (OFDM) symbol. In one or more examples, the RMTC parameter may be illustrated in the following table.

| Parameter type | Parameter value |
| --- | --- |
| Measurement period (T) | Any value in a set {40 ms, 80 ms, 160 ms, 320 ms, 640 ms} |
| Measurement starting position | Any value in 0 to T-1 |
| Terminal measurement duration | Any value in a set {1 OFDM symbol, 14 OFDM symbols, 28 OFDM symbols, 42 OFDM symbols, 70 OFDM symbols} |

It can be seen from the table that a channel measurement period, a measurement starting position and a measurement duration are configured in the RMTC parameter respectively. In addition, the sampling point during terminal measurement may be 1 OFDM symbol, so that the terminal may measure the channel parameter according to the measurement period, the measurement starting position and the terminal measurement duration in the RMTC parameter.

In a frame structure of an NR system, a radio frame, like a long term evolution (LTE) frame, is 10 ms long and includes 10 subframes, each subframe is 1 ms long, and each slot includes 14 OFDM symbols (each slot in the LAA system includes 7 symbols). However, a subcarrier spacing in the frame structure of the NR system is dynamically variable, and the subcarrier spacing may be $\Delta f=2^u*15$ [kHz], where a value of u may be 0, 1, 2, 3 and 4. When u is 0, the subcarrier spacing is 15 kHz, each subframe includes 1 slot, each slot includes 14 OFDM symbols, and thus each subframe includes 14 OFDM symbols. When u is 1, the subcarrier spacing is 30 kHz, each subframe includes 2 slots, each slot includes 14 OFDM symbols, and thus each subframe includes 25 OFDM symbols. When u is 2, the subcarrier spacing is 60 kHz, each subframe includes 4 slots, each slot includes 14 OFDM symbols, and thus each subframe includes 56 OFDM symbols. When u is 3, the subcarrier spacing is 120 kHz, each subframe includes 8 slots, each slot includes 14 OFDM symbols, and thus each subframe includes 112 OFDM symbols. When u is 4, the subcarrier spacing is 240 kHz, each subframe includes 16 slots, each slot includes 14 OFDM symbols, and thus each subframe includes 224 OFDM symbols. However, since each subframe is fixedly 1 ms long, each OFDM symbol has different lengths under different subcarrier spacings.

Based on the above descriptions, in an NR system, when a terminal measures a channel parameter, both a terminal measurement duration and a sampling point are measured by use of the OFDM symbol. Therefore, under the condition that a subcarrier spacing is dynamically variable, if the terminal measurement duration is still configured according to a manner in an LTE system, the terminal may measure terminal measurement durations according to a fixed OFDM symbol length under different subcarrier spacings, resulting in deviations of the terminal measurement durations and further resulting in inaccuracy of measurement results.

In one or more embodiments of the present disclosure, a channel measurement method and apparatus, a storage medium, a terminal and a base station are provided. In the method, a terminal may determine different subcarrier spacings and corresponding terminal measurement durations according to an RMTC parameter configured by a base station, and then, for different subcarrier spacings, the terminal may perform channel measurement according to the terminal measurement durations corresponding to the corresponding subcarrier spacings, so that deviations of the terminal measurement durations are avoided, and the channel measurement accuracy is further improved.

The present disclosure will be described below in combination with one or more embodiments.

FIG. 1 illustrates a channel measurement method according to an embodiment of the present disclosure. As illustrated in FIG. 1, the method is applied to a terminal and includes as follows.

In step 101, an RMTC parameter sent by a base station is received.

The RMTC parameter may be configured by the base station for the terminal. In the step, after configuring the RMTC parameter, the base station may send the RMTC parameter to the terminal through RRC signaling. The terminal, after receiving the RRC signaling, may obtain the RMTC parameter from the RRC signaling.

In the step, the RMTC parameter includes indication information of at least one subcarrier spacing and a terminal measurement duration corresponding to the indication information, and different indication information corresponds to different terminal measurement durations. The indication information is configured to represent the subcarrier spacing.

The indication information may be a spacing identifier of the subcarrier spacing, and in such case, the terminal may determine subcarrier spacings corresponding to different terminal measurement durations through spacing identifiers. In addition, the indication information may also be a field position of the terminal measurement duration in the RMTC parameter, and in such case, the terminal may determine subcarrier spacings corresponding to different terminal measurement durations through the field position of each terminal measurement duration in the RMTC parameter.

In step 102, a target terminal measurement duration corresponding to at least one target subcarrier spacing to be measured is determined according to indication information of at least one subcarrier spacing and a terminal measurement duration corresponding to the indication information.

Since different indication information corresponds to different terminal measurement durations and the indication information is configured to represent the subcarrier spacing, different target subcarrier spacings correspond to different target terminal measurement durations.

In the step, the following three implementation modes may be included.

In a first mode, when the RMTC parameter includes indication information of multiple subcarrier spacings and terminal measurement durations corresponding to the indication information of the multiple subcarrier spacings, the terminal may determine indication information of the target subcarrier spacing in the indication information of the multiple subcarrier spacings and determine a terminal measurement duration corresponding to the indication information of the target subcarrier spacing as the target terminal measurement duration corresponding to the target subcarrier spacing, and the indication information of the target subcarrier spacing includes all or part of the indication information of the multiple subcarrier spacings.

In one or more examples, the terminal may parse the RMTC parameter to obtain the indication information of all or part of subcarrier spacings and determine the obtained indication information of all or part of the subcarrier spacings as the indication information of the target subcarrier spacing.

In a second mode, when the RMTC parameter includes indication information of any subcarrier spacing and a first terminal measurement duration corresponding to the indication information of the any subcarrier spacing, the terminal may determine the indication information of the any subcarrier spacing as the indication information of the target subcarrier spacing and determine the first terminal measurement duration corresponding to the indication information of the target subcarrier spacing as the target terminal measurement duration corresponding to the target subcarrier spacing.

In a third mode, when the RMTC parameter includes indication information of any subcarrier spacing and a second terminal measurement duration corresponding to the indication information of the any subcarrier spacing, the terminal may determine a preset target subcarrier spacing, determine a third terminal measurement duration corresponding to the target subcarrier spacing according to the indication information of the any subcarrier spacing and the second terminal measurement duration corresponding to the indication information of the any subcarrier spacing and determine the third terminal measurement duration as the target terminal measurement duration.

In a possible implementation mode of acquiring the third terminal measurement duration, the terminal may acquire a preset time multiplier, corresponding to the any subcarrier spacing, of the target subcarrier spacing according to the indication information of the any subcarrier spacing and multiply the second terminal measurement duration and the preset time multiplier to obtain the third terminal measurement duration corresponding to the target subcarrier spacing.

In step 103, channel measurement is performed according to the target terminal measurement duration. Channel measurement may include, for example, measuring of channel parameters. The parameters may include, for example, a period, starting position, and duration.

In the step, the terminal may acquire a sampled signal according to the RMTC parameter and the target terminal measurement duration and obtain an RSSI and a channel occupancy rate according to the sampled signal. For a sampling point corresponding to each subcarrier spacing, an OFDM symbol length under the subcarrier spacing may be adopted, namely signal sampling is performed once based on each OFDM symbol length.

It is to be noted that measurement of the RSSI and the channel occupancy rate may refer to measurement of an RSSI and a channel occupancy rate in a conventional art and will not be repeated herein.

After channel measurement, the terminal reports a measurement result obtained after measurement to the base station.

Through the method, the terminal may determine different subcarrier spacings and corresponding terminal measurement durations according to the RMTC parameter configured by the base station, and then, for different subcarrier spacings, the terminal may perform channel measurement according to the terminal measurement durations corresponding to the corresponding subcarrier spacings, so that deviations of the terminal measurement durations are avoided, and the channel measurement accuracy is further improved.

Figure 2:
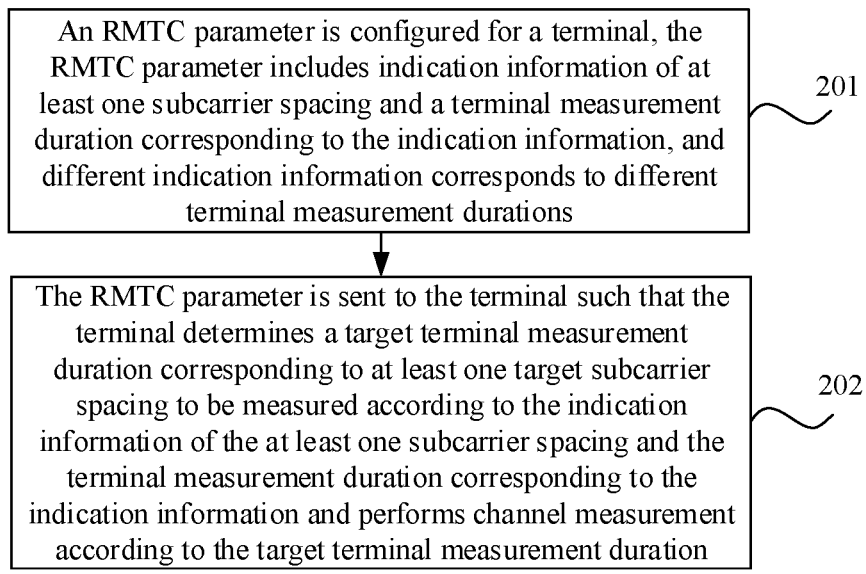
FIG. 2 is a flow chart showing another channel measurement method, according to an example of the present disclosure.

FIG. 2 illustrates a channel measurement method according to an embodiment of the present disclosure. As illustrated in FIG. 2, the method is applied to a base station and includes as follows.

In step 201, an RMTC parameter is configured for a terminal, the RMTC parameter includes indication information of at least one subcarrier spacing and a terminal measurement duration corresponding to the indication information, and different indication information corresponds to different terminal measurement durations.

The indication information is configured to represent the subcarrier spacing. The indication information may be a spacing identifier of the subcarrier spacing, and in such case, the terminal may determine subcarrier spacings corresponding to different terminal measurement durations through spacing identifiers. In addition, the indication information may also be a field position of the terminal measurement duration in the RMTC parameter, and in such case, the terminal may determine subcarrier spacings corresponding to different terminal measurement durations through the field position of each terminal measurement duration in the RMTC parameter.

In step 202, the RMTC parameter is sent to the terminal such that the terminal determines a target terminal measurement duration corresponding to at least one target subcarrier spacing to be measured according to the indication information of the at least one subcarrier spacing and the terminal measurement duration corresponding to the indication information and performs channel measurement according to the target terminal measurement duration.

In the step, RRC signaling including the RMTC parameter may be sent to the terminal such that the terminal obtains the RMTC parameter from the RRC signaling.

After the terminal acquires the RMTC parameter, if the RMTC parameter in step 201 includes indication information of multiple subcarrier spacings and terminal measurement durations corresponding to the indication information of the multiple subcarrier spacings, the terminal may determine indication information of the target subcarrier spacing in the indication information of the multiple subcarrier spacings and determine a terminal measurement duration corresponding to the indication information of the target subcarrier spacing as the target terminal measurement duration corresponding to the target subcarrier spacing, and the indication information of the target subcarrier spacing includes all or part of the indication information of the multiple subcarrier spacings.

In one or more examples, the terminal may parse the RMTC parameter to obtain the indication information of all or part of subcarrier spacings and determine the obtained indication information of all or part of the subcarrier spacings as the indication information of the target subcarrier spacing.

If the RMTC parameter in step 201 includes indication information of any subcarrier spacing and a first terminal measurement duration corresponding to the indication information of the any subcarrier spacing, the terminal may determine the indication information of the any subcarrier spacing as the indication information of the target subcarrier spacing and determine the first terminal measurement duration corresponding to the indication information of the target subcarrier spacing as the target terminal measurement duration corresponding to the target subcarrier spacing.

If the RMTC parameter in step 201 includes indication information of any subcarrier spacing and a second terminal measurement duration corresponding to the indication information of the any subcarrier spacing, the terminal may determine a preset target subcarrier spacing, determine a third terminal measurement duration corresponding to the target subcarrier spacing according to the indication information of the any subcarrier spacing and the second terminal measurement duration corresponding to the indication information of the any subcarrier spacing and determine the third terminal measurement duration as the target terminal measurement duration.

Through the method, the base station configures the RMTC parameter to cause the terminal to determine different subcarrier spacings and corresponding terminal measurement durations according to the RMTC parameter configured by the base station, and then, for different subcarrier spacings, the terminal may perform channel measurement according to the terminal measurement durations corresponding to the corresponding subcarrier spacings, so that deviations of the terminal measurement durations are avoided, and the channel measurement accuracy is further improved.

Figure 3:
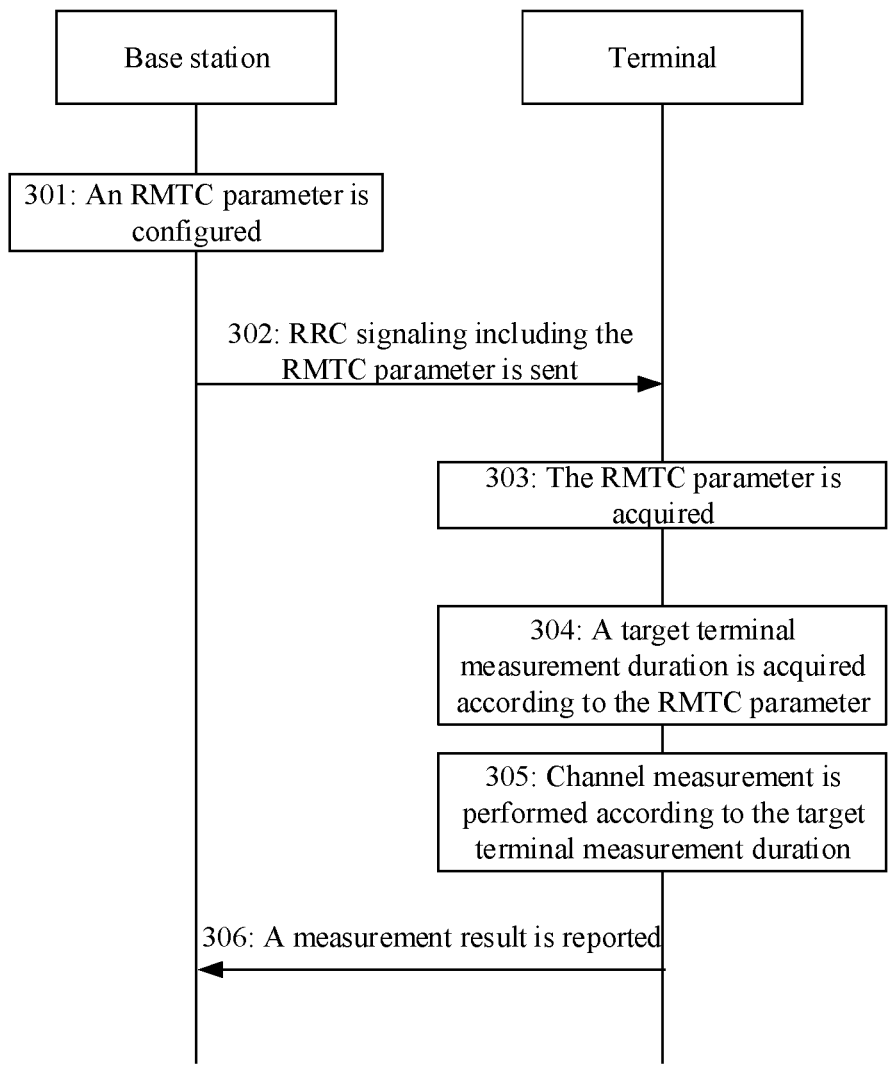
FIG. 3 is a diagram illustrating signaling interactions of a channel measurement method, according to an example of the present disclosure.

FIG. 3 illustrates a channel measurement method according to an embodiment of the present disclosure. As illustrated in FIG. 3, the method includes as follows.

In step 301, a base station configures an RMTC parameter for a terminal.

The RMTC parameter includes indication information of at least one subcarrier spacing and a terminal measurement duration corresponding to the indication information, and different indication information corresponds to different terminal measurement durations.

Here, the indication information is configured to represent the subcarrier spacing. The indication information may be a spacing identifier of the subcarrier spacing, and in such case, the terminal may determine subcarrier spacings corresponding to different terminal measurement durations through spacing identifiers.

For example, the spacing identifier of the subcarrier spacing may be u. When u is equal to 0 (u=0), the represented subcarrier spacing is 15 kHz. When u=1, the represented subcarrier spacing is 30 kHz. When u=2, the represented subcarrier spacing is 60 kHz. When u=3, the represented subcarrier spacing is 120 kHz. Of course, the spacing identifiers described here are only examples and no limits are made thereto in the present disclosure.

In addition, the indication information may also be a field position of the terminal measurement duration in the RMTC parameter, and in such case, the terminal may determine subcarrier spacings corresponding to different terminal measurement durations through the field position of each terminal measurement duration in the RMTC parameter. For example, when the RMTC parameter includes four terminal measurement durations, according to a sequence from front to rear field positions, the terminal may sequentially determine the terminal measurement duration corresponding to the subcarrier spacing 15 kHz, the terminal measurement duration corresponding to the subcarrier spacing 30 kHz, the terminal measurement duration corresponding to the subcarrier spacing 60 kHz and the terminal measurement duration corresponding to the subcarrier spacing 120 kHz. Here, only examples are described, and no limits are made.

In the step, the following two configuration manners may be adopted for the RMTC parameter.

In a first manner, the RMTC parameter includes indication information of multiple subcarrier spacings and terminal measurement durations corresponding to the indication information of the multiple subcarrier spacings.

For example, the RMTC parameter may be configured as illustrated in the following Table 1.

TABLE 1

| Parameter type | Parameter value |
| --- | --- |
| Measurement period (T) | Any value in a set {40 ms, 80 ms, 160 ms, 320 ms, 640 ms} |
| Measurement starting position | Any value in 0 to T-1 |
| Terminal measurement duration (u = 0) | Any value in a set {X1 OFDM symbols, X2 OFDM symbols, X3 OFDM symbols, X4 OFDM symbols, X5 OFDM symbols, X6 OFDM symbols} |
| Terminal measurement duration (u = 1) | Any value in a set {Y1 OFDM symbols, Y2 OFDM symbols, Y3 OFDM symbols, Y4 OFDM symbols, Y5 OFDM symbols, Y6 OFDM symbols} |
| Terminal measurement duration (u = 2) | Any value in a set {Z1 OFDM symbols, Z2 OFDM symbols, Z3 OFDM symbols, Z4 OFDM symbols, Z5 OFDM symbols, Z6 OFDM symbols} |
| Terminal measurement duration (u = 3) | Any value in a set {P1 OFDM symbols, P2 OFDM symbols, P3 OFDM symbols, P4 OFDM symbols, P5 OFDM symbols, P6 OFDM symbols} |

An OFDM symbol length corresponding to each terminal measurement duration is an OFDM symbol length under the subcarrier spacing corresponding to the terminal measurement duration.

For example, an OFDM symbol length in a parameter value corresponding to the terminal measurement duration (u=0) is an OFDM symbol length when the subcarrier spacing is 15 kHz, an OFDM symbol length in a parameter value corresponding to the terminal measurement duration (u=1) is an OFDM symbol length when the subcarrier spacing is 30 kHz, an OFDM symbol length in a parameter value corresponding to the terminal measurement duration (u=2) is an OFDM symbol length when the subcarrier spacing is 60 kHz, and an OFDM symbol length in a parameter value corresponding to the terminal measurement duration (u=3) is an OFDM symbol length when the subcarrier spacing is 120 kHz.

It can be seen from Table 1 that different terminal measurement durations are configured respectively for u=0,1,2,3 (i.e., the identifier of the subcarrier spacing) in the RMTC parameter. The terminal measurement duration (u=0) represents the terminal measurement duration corresponding to the subcarrier spacing with the value of 15 kHz, and the terminal measurement duration includes any value in a set {X1 OFDM symbols, X2 OFDM symbols, X3 OFDM symbols, X4 OFDM symbols, X5 OFDM symbols, X6 OFDM symbols}, namely the base station may configure any value in X1 OFDM symbols, X2 OFDM symbols, X3 OFDM symbols, X4 OFDM symbols, X5 OFDM symbols and X6 OFDM symbols as the terminal measurement duration corresponding to the subcarrier spacing with the value of 15 kHz. The terminal measurement duration (u=1) represents the terminal measurement duration corresponding to the subcarrier spacing with the value of 30 kHz, and the terminal measurement duration includes any value in a set {Y1 OFDM symbols, Y2 OFDM symbols, Y3 OFDM symbols, Y4 OFDM symbols, Y5 OFDM symbols, Y6 OFDM symbols}, namely the base station may configure any value in Y1 OFDM symbols, Y2 OFDM symbols, Y3 OFDM symbols, Y4 OFDM symbols, Y5 OFDM symbols and Y6 OFDM symbols as the terminal measurement duration corresponding to the subcarrier spacing with the value of 30 kHz. The terminal measurement duration (u=2) represents the terminal measurement duration corresponding to the subcarrier spacing with the value of 60 kHz, and the terminal measurement duration includes any value in a set {Z1 OFDM symbols, Z2 OFDM symbols, Z3 OFDM symbols, Z4 OFDM symbols, Z5 OFDM symbols, Z6 OFDM symbols}, namely the base station may configure any value in Z1 OFDM symbols, Z2 OFDM symbols, Z3 OFDM symbols, Z4 OFDM symbols, Z5 OFDM symbols and Z6 OFDM symbols as the terminal measurement duration corresponding to the subcarrier spacing with the value of 60 kHz. The terminal measurement duration (u=3) represents the terminal measurement duration corresponding to the subcarrier spacing with the value of 120 kHz, and the terminal measurement duration includes any value in a set {P1 OFDM symbols, P2 OFDM symbols, P3 OFDM symbols, P4 OFDM symbols, P5 OFDM symbols, P6 OFDM symbols}, namely the base station may configure any value in P1 OFDM symbols, P2 OFDM symbols, P3 OFDM symbols, P4 OFDM symbols, P5 OFDM symbols and P6 OFDM symbols as the terminal measurement duration corresponding to the subcarrier spacing with the value of 120 kHz.

It is to be noted that the RMTC table is described with the four subcarrier spacings as examples (u=0, 1, 2, 3) and the present disclosure is not limited thereto. For example, terminal measurement durations (u=0, 1, 2, 3, 4) corresponding to five subcarrier spacings may also be configured respectively, and the terminal measurement durations (u=0, 1; or u=1, 2; u=0, 2 or the like) corresponding to two subcarrier spacings may also be configured respectively. Of course, the terminal measurement durations (u=0, 1, 2; u=1, 2, 3 or the like) corresponding to three subcarrier spacings may also be configured respectively.

It is also to be noted that inclusion of six parameter values in parameter value sets of the terminal measurement duration corresponding to different subcarrier spacings in the RMTC parameter is also an example, no limits are made thereto in the present disclosure and the parameter value set of the terminal measurement duration may include at least one parameter value. For example, the parameter value set {X1 OFDM symbols, X2 OFDM symbols, X3 OFDM symbols, X4 OFDM symbols, X5 OFDM symbols, X6 OFDM symbols} corresponding to the terminal measurement duration (u=0) is not limited to include six parameter values and may include at least one parameter value such as one or more. In addition, X1, X2, . . . , X6 in the parameter value set do not represent specific numerical values, and the specific numerical values may be configured in advance by those involved. Of course, the terminal measurement duration (u=1), the terminal measurement duration (u=2) and the terminal measurement duration (u=3) are also examples, descriptions about them may refer to the description about the terminal measurement duration (u=0), and elaborations are omitted.

In a second manner, the RMTC parameter includes indication information of any subcarrier spacing and a first terminal measurement duration or a second terminal measurement duration corresponding to the indication information of the any subcarrier spacing.

In such case, the terminal, after acquiring the first terminal measurement duration or the second terminal measurement duration, may determine a target terminal measurement duration corresponding to a target subcarrier spacing according to the first terminal measurement duration or the second terminal measurement duration.

An OFDM symbol length corresponding to each target terminal measurement duration is an OFDM symbol length under a target subcarrier spacing corresponding to the second terminal measurement duration.

In one or more examples, referring to Table 1, in this manner, the RMTC parameter may include a measurement period, a measurement starting position and a terminal measurement duration (u=0) only, and the terminal measurement duration (u=0) is the terminal measurement duration corresponding to the subcarrier spacing with the value of 15 kHz. The terminal, after acquiring a first terminal measurement duration corresponding to the subcarrier spacing with the value of 15 kHz, may obtain a second terminal measurement duration corresponding to the target subcarrier spacing according to the first terminal measurement duration. Of course, the RMTC parameter may also include the terminal measurement duration corresponding to the subcarrier spacing with the value of 30 kHz, or the terminal measurement duration corresponding to the subcarrier spacing with the value of 60 kHz, or a terminal measurement duration corresponding to any other subcarrier spacing. No limits are made thereto in the present disclosure.

In step 302, the base station sends RRC signaling including the RMTC parameter to the terminal.

In step 303, the terminal, after receiving the RRC signaling, acquires the RMTC parameter from the RRC signaling.

In step 304, the terminal determines a target terminal measurement duration corresponding to at least one target subcarrier spacing to be measured according to indication information of at least one subcarrier spacing and terminal measurement duration corresponding to the indication information in the RMTC parameter.

Different subcarrier spacings correspond to different target terminal measurement durations.

Here, considering a measurement capability of the terminal (for example, power consumption of the terminal and the like), the terminal may not measure all subcarrier spacings, so that the terminal may determine the target terminal measurement duration corresponding to the at least one subcarrier spacing according to the RMTC parameter. That is, the terminal may determine the number of subcarrier spacings which needs to be measured according to its own measurement capability.

In a possible implementation mode, for the first manner for the RMTC parameter in step 301, i.e., the manner (i.e., the first manner) that the RMTC parameter includes indication information of multiple subcarrier spacings and terminal measurement durations corresponding to the indication information of the multiple subcarrier spacings, the terminal may determine indication information of the target subcarrier spacing in the indication information of the multiple subcarrier spacings and determine a terminal measurement duration corresponding to the indication information of the target subcarrier spacing as the target terminal measurement duration corresponding to the target subcarrier spacing, and the indication information of the target subcarrier spacing includes all or part of the indication information of the multiple subcarrier spacings.

In one or more examples, the terminal may parse the RMTC parameter to obtain the indication information of all or part of subcarrier spacings and determine the obtained indication information of all or part of the subcarrier spacings as the indication information of the target subcarrier spacing.

For example, descriptions are made with the RMTC parameter illustrated in Table 1 as an example. The terminal may parse the RMTC parameter illustrated in Table 1 to determine any one of the terminal measurement duration (u=0), the terminal measurement duration (u=1), the terminal measurement duration (u=2) and the terminal measurement duration (u=3) as the target terminal measurement duration, may also determine the terminal measurement duration (u=0) and the terminal measurement duration (u=1) as target terminal measurement durations, may also determine the terminal measurement duration (u=0), the terminal measurement duration (u=1) and the terminal measurement duration (u=2) as target terminal measurement durations, and may also determine all the terminal measurement duration (u=0), the terminal measurement duration (u=1), the terminal measurement duration (u=2) and the terminal measurement duration (u=3) as target terminal measurement durations.

In a possible implementation mode, for the manner (i.e., the second manner) that the RMTC parameter includes indication information of any subcarrier spacing and a first terminal measurement duration or second terminal measurement duration corresponding to the indication information of the any subcarrier spacing in step 301, if the RMTC parameter includes indication information of any subcarrier spacing and a first terminal measurement duration corresponding to the indication information of the any subcarrier spacing, the terminal may determine the indication information of the any subcarrier spacing as the indication information of the target subcarrier spacing and determine the first terminal measurement duration corresponding to the indication information of the target subcarrier spacing as the target terminal measurement duration corresponding to the target subcarrier spacing.

If the RMTC parameter includes indication information of any subcarrier spacing and a second terminal measurement duration corresponding to the indication information of the any subcarrier spacing, the terminal may determine the preset target subcarrier spacing, determine a third terminal measurement duration corresponding to the target subcarrier spacing according to the indication information of the any subcarrier spacing and the second terminal measurement duration corresponding to the indication information of the any subcarrier spacing and determine the third terminal measurement duration as the target terminal measurement duration.

In a possible implementation mode of acquiring the third terminal measurement duration, the terminal may acquire a preset time multiplier, corresponding to the any subcarrier spacing, of the target subcarrier spacing according to the indication information of the any subcarrier spacing and multiply the second terminal measurement duration and the preset time multiplier to obtain the third terminal measurement duration corresponding to the target subcarrier spacing.

For example, the RMTC parameter may include that the terminal measurement duration corresponding to the subcarrier spacing with the value of 15 kHz is 1 OFDM symbol. In such case, if the terminal, after parsing the RMTC parameter, determines that the preset target subcarrier spacing is 30 kHz, 60 kHz and 120 kHz and determines that a preset time multiplier of 30 kHz relative to the subcarrier spacing 15 kHz is 2, a preset time multiplier of 60 kHz relative to the subcarrier spacing 15 kHz is 4 and a preset time multiplier of 120 kHz relative to the subcarrier spacing 15 kHz is 8, it is determined that a third terminal measurement duration corresponding to the target subcarrier spacing with the value of 30 kHz is 2 OFDM symbols (the OFDM symbol length is the OFDM symbol length when the subcarrier spacing is 30 kHz), a third terminal measurement duration corresponding to the target subcarrier spacing with the value of 60 kHz is 4 OFDM symbols (the OFDM symbol length is the OFDM symbol length when the subcarrier spacing is 60 kHz) and a third terminal measurement duration corresponding to the target subcarrier spacing with the value of 120 kHz is 8 OFDM symbols (the OFDM symbol length is the OFDM symbol length when the subcarrier spacing is 120 kHz), thereby obtaining the target terminal measurement durations corresponding to the target subcarrier spacings.

In step 305, the terminal performs channel measurement according to the target terminal measurement duration.

In the step, the terminal may acquire a sampled signal according to the target terminal measurement duration and obtain an RSSI and a channel occupancy rate according to the sampled signal. For a sampling point corresponding to each subcarrier spacing, an OFDM symbol length under the subcarrier spacing may be adopted, namely signal sampling is performed once based on each OFDM symbol length.

It is to be noted that measurement of the RSSI and the channel occupancy rate may refer to measurement of an RSSI and a channel occupancy rate in a conventional art and will not be repeated herein.

In step 306, the terminal reports a channel measurement result to the base station.

Through the method, the terminal may determine different subcarrier spacings and corresponding terminal measurement durations according to the RMTC parameter configured by the base station, and then, for different subcarrier spacings, the terminal may perform channel measurement according to the terminal measurement durations corresponding to the corresponding subcarrier spacings, so that deviations of the terminal measurement durations are avoided, and the channel measurement accuracy is further improved.

Figure 4:
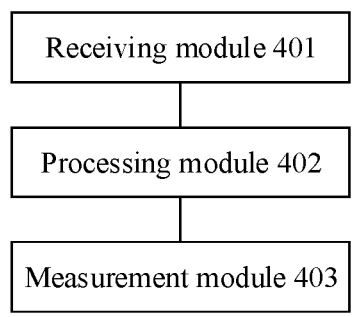
FIG. 4 is a structure diagram of a channel measurement apparatus, according to an example of the present disclosure.

FIG. 4 illustrates a channel measurement apparatus according to an embodiment of the present disclosure. As illustrated in FIG. 4, the apparatus is applied to a terminal and includes a receiving module 401, a processing module 402 and a measurement module 403.

The receiving module 401 is configured to receive an RMTC parameter sent by a base station. The RMTC parameter includes indication information of at least one subcarrier spacing and a terminal measurement duration corresponding to the indication information, and different indication information corresponds to different terminal measurement durations.

The indication information is configured to represent the subcarrier spacing.

The processing module 402 is configured to determine a target terminal measurement duration corresponding to at least one target subcarrier spacing to be measured according to the indication information of the at least one subcarrier spacing and the terminal measurement duration corresponding to the indication information.

The measurement module 403 is configured to perform channel measurement according to the target terminal measurement duration.

Optionally, the processing module 402 is configured to, when the RMTC parameter includes indication information of multiple subcarrier spacings and terminal measurement durations corresponding to the indication information of the multiple subcarrier spacings, determine indication information of the target subcarrier spacing in the indication information of the multiple subcarrier spacings and determine a terminal measurement duration corresponding to the indication information of the target subcarrier spacing as the target terminal measurement duration corresponding to the target subcarrier spacing. The indication information of the target subcarrier spacing includes all or part of the indication information of the multiple subcarrier spacings.

Optionally, the processing module 402 is configured to, when the RMTC parameter includes indication information of any subcarrier spacing and a first terminal measurement duration corresponding to the indication information of the any subcarrier spacing, determine the indication information of the any subcarrier spacing as the indication information of the target subcarrier spacing and determine the first terminal measurement duration corresponding to the indication information of the target subcarrier spacing as the target terminal measurement duration corresponding to the target subcarrier spacing.

Optionally, the processing module 402 is configured to, when the RMTC parameter includes indication information of any subcarrier spacing and a second terminal measurement duration corresponding to the indication information of the any subcarrier spacing, determine a preset target subcarrier spacing, determine a third terminal measurement duration corresponding to the target subcarrier spacing according to the indication information of the any subcarrier spacing and the second terminal measurement duration corresponding to the indication information of the any subcarrier spacing and determine the third terminal measurement duration as the target terminal measurement duration.

Optionally, the processing module 402 is configured to acquire a preset time multiplier, corresponding to the any subcarrier spacing, of the target subcarrier spacing according to the indication information of the any subcarrier spacing and multiply the second terminal measurement duration and the preset time multiplier to obtain the third terminal measurement duration corresponding to the target subcarrier spacing.

Through the apparatus, the terminal may determine different subcarrier spacings and corresponding terminal measurement durations according to the RMTC parameter configured by the base station, and then, for different subcarrier spacings, the terminal may perform channel measurement according to the terminal measurement durations corresponding to the corresponding subcarrier spacings, so that deviations of the terminal measurement durations are avoided, and the channel measurement accuracy is further improved.

Figure 5:
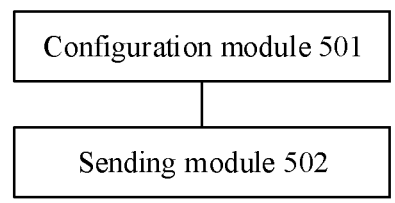
FIG. 5 is a structure diagram of another channel measurement apparatus, according to an example of the present disclosure.

FIG. 5 illustrates a channel measurement apparatus according to an embodiment of the present disclosure. As illustrated in FIG. 5, the apparatus is applied to a base station and includes a configuration module 501 and a sending module 502.

The configuration module 501 is configured to configure an RMTC parameter for a terminal. The RMTC parameter includes indication information of at least one subcarrier spacing and a terminal measurement duration corresponding to the indication information, and different indication information corresponds to different terminal measurement durations.

The indication information is configured to represent the subcarrier spacing.

The sending module 502 is configured to send the RMTC parameter to the terminal such that the terminal determines a target terminal measurement duration corresponding to at least one target subcarrier spacing to be measured according to the indication information of the at least one subcarrier spacing and the terminal measurement duration corresponding to the indication information and performs channel measurement according to the target terminal measurement duration.

Optionally, the sending module 502 is configured to send RRC signaling including the RMTC parameter to the terminal such that the terminal obtains the RMTC parameter from the RRC signaling.

Through the apparatus, the base station configures the RMTC parameter to cause the terminal to determine different subcarrier spacings and corresponding terminal measurement durations according to the RMTC parameter configured by the base station, and then, for different subcarrier spacings, the terminal may perform channel measurement according to the terminal measurement durations corresponding to the corresponding subcarrier spacings, so that deviations of the terminal measurement durations are avoided, and the channel measurement accuracy is further improved.

With respect to the apparatus in the above embodiment, the specific manners for performing operations for individual modules therein have been described in detail in the embodiment regarding the method, which will not be repeated herein.

Figure 6:
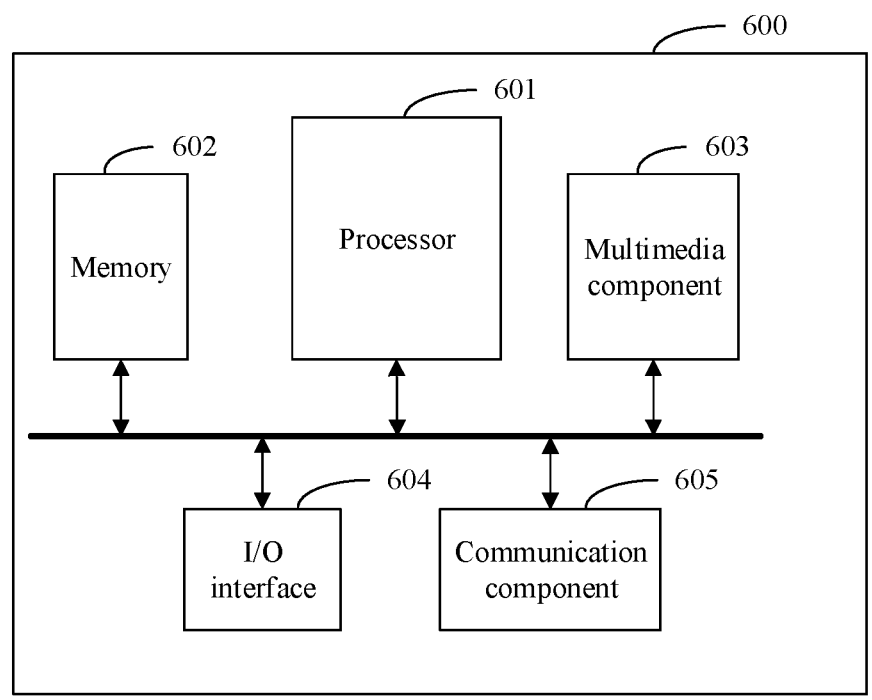
FIG. 6 is a structure diagram of a terminal, according to an example of the present disclosure.

FIG. 6 is a block diagram of a terminal 600, according to an embodiment. As illustrated in FIG. 6, the terminal 600 may include a processor 601 and a memory 602. The terminal 600 may further include one or more of a multimedia component 603, an input/output (I/O) interface 604 or a communication component 605. Processor 601 may include one or more processors.

The processor 601 is configured to control overall operations of the terminal 600 to complete all or part of the steps in the above channel measurement method. The memory 602 is configured to store various types of data to support the operation of the terminal 600. Examples of such data include instructions for any application programs or methods operated on the terminal 600 and data related to the application programs, for example, contact data, transmitted and received messages, pictures, audio, video, etc. The memory 602 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk. The multimedia component 603 may include a screen and an audio component. The screen may be, for example, a touch screen, and the audio component is configured to output and/or input an audio signal. For example, the audio component may include a microphone, and the microphone is configured to receive an external audio signal. The received audio signal may further be stored in the memory 602 or sent through the communication component 605. The audio component further includes at least one speaker configured to output the audio signal. The I/O interface 604 provides an interface between the processor 601 and other interface modules, and the other interface module may be a keyboard, a mouse, buttons and the like. These buttons may be virtual buttons or physical buttons. The communication component 605 is configured for wired or wireless communication between the terminal 600 and other devices. Wireless communication is, for example, WiFi, Bluetooth, near field communication (NFC), 2nd-generation (2G), 3rd-generation (3G) or 4th-generation (4G) or one or combination of multiple therein, and thus the communication component 605 may correspondingly include a WiFi module, a Bluetooth module, an NFC module and the like.

In some embodiments, the terminal 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute any channel measurement method above.

In one or more embodiments, there is also provided a non-transitory computer-readable storage medium including program instructions. The program instructions are executed by a processor to implement the steps of the above channel measurement method. For example, the non-transitory computer-readable storage medium may be the memory 602 including the program instructions, and the program instructions may be executed by the processor 601 of the terminal 600 to complete the above channel measurement method.

Figure 7:
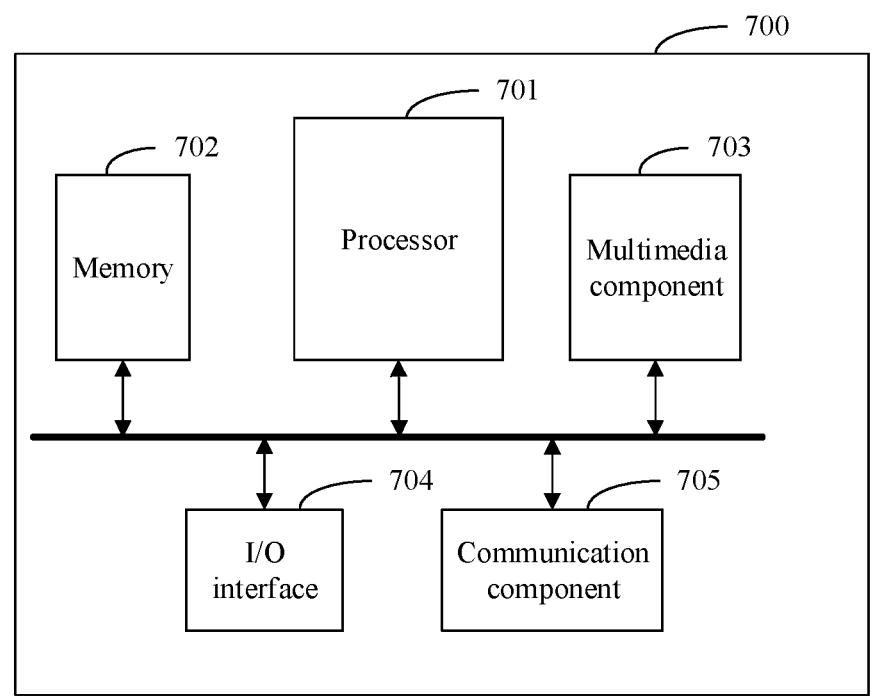
FIG. 7 is a structure diagram of a base station, according to an example of the present disclosure.

FIG. 7 is a block diagram of a base station 700, according to an embodiment. As illustrated in FIG. 7, the base station 700 may include a processor 701 and a memory 702. The base station 700 may further include one or more of a multimedia component 703, an I/O interface 704 or a communication component 705. Processor 701 may include one or more processors.

The processor 701 is configured to control overall operations of the base station 700 to complete all or part of the steps in the above channel measurement method. The memory 702 is configured to store various types of data to support the operation of the base station 700. Examples of such data include instructions for any application programs or methods operated on the base station 700 and data related to the application programs, for example, contact data, transmitted and received messages, pictures, audio, video, etc. The memory 702 may be implemented by any type of volatile or non-volatile memory devices, or a combination thereof, such as an SRAM, an EEPROM, an EPROM, a PROM, a ROM, a magnetic memory, a flash memory, and a magnetic or optical disk. The multimedia component 703 may include a screen and an audio component. The screen may be, for example, a touch screen, and the audio component is configured to output and/or input an audio signal. For example, the audio component may include a microphone, and the microphone is configured to receive an external audio signal. The received audio signal may further be stored in the memory 702 or sent through the communication component 705. The audio component further includes at least one speaker configured to output the audio signal. The I/O interface 704 provides an interface between the processor 701 and other interface modules, and the other interface module may be a keyboard, a mouse, buttons and the like. These buttons may be virtual buttons or physical buttons. The communication component 705 is configured for wired or wireless communication between the base station 700 and other devices. Wireless communication is, for example, WiFi, Bluetooth, NFC, 2G, 3G or 4G or one or combination of multiple therein, and thus the communication component 705 may correspondingly include a WiFi module, a Bluetooth module, an NFC module and the like.

In one or more embodiments, the terminal 700 may be implemented by one or more ASICs, DSPs, DSPDs, PLDs, FPGAs, controllers, micro-controllers, microprocessors or other electronic components, and is configured to execute any channel measurement method above.

In some embodiments, there is also provided a non-transitory computer-readable storage medium including program instructions. The program instructions are executed by one or more processors to implement the steps of the above channel measurement method. For example, the non-transitory computer-readable storage medium may be the memory 702 including the program instructions, and the program instructions may be executed by the processor 701 of the base station 700 to complete the above channel measurement method.

An implementation mode of the present disclosure is described above in combination with the accompanying drawings in detail, but the present disclosure is not limited to specific details in the implementation mode, various simple transformations may be made to the technical improvements of the present disclosure within the scope of the technical concept of the present disclosure and all these simple transformations shall fall within the scope of protection of the present disclosure.

In addition, it is to be noted that each specific technical feature described in the specific implementation modes may be combined in any proper manner without conflicts, and for avoiding unnecessary repetitions, each possible combination manner is not further described in the present disclosure.

Moreover, different implementation modes of the present disclosure may also be freely combined without prejudice to the idea of the present disclosure, and such combinations shall also be considered as contents disclosed in the present disclosure.

What is claimed is:

1. A method for channel measurement, applied to a terminal, the method comprising:
   receiving a received signal strength indicator (RSSI) measurement timing configuration (RMTC) parameter sent by a base station, wherein the RMTC parameter comprises indication information of at least one subcarrier spacing and a terminal measurement duration corresponding to the indication information, wherein different indication information corresponds to different terminal measurement durations;
   determining a target terminal measurement duration corresponding to at least one target subcarrier spacing to be measured according to the indication information of the at least one subcarrier spacing and the terminal measurement duration corresponding to the indication information; and
   performing channel measurement according to the target terminal measurement duration;
   wherein determining the target terminal measurement duration corresponding to the at least one target subcarrier spacing to be measured according to the indication information of the at least one subcarrier spacing and the terminal measurement duration corresponding to the indication information comprises:
   determining, in response to the RMTC parameter comprising indication information of any subcarrier spacing and a second terminal measurement duration corresponding to the indication information of the any subcarrier spacing, a preset target subcarrier spacing; and
   determining a third terminal measurement duration corresponding to the target subcarrier spacing according to the indication information of the any subcarrier spacing and the second terminal measurement duration corresponding to the indication information of the any subcarrier spacing, and determining the third terminal measurement duration as the target terminal measurement duration.

2. The method of claim 1, wherein determining the third terminal measurement duration corresponding to the target subcarrier spacing according to the indication information of the any subcarrier spacing and the second terminal measurement duration corresponding to the indication information of the any subcarrier spacing comprises:
   acquiring a preset time multiplier, corresponding to the any subcarrier spacing, of the target subcarrier spacing according to the indication information of the any subcarrier spacing; and
   multiplying the second terminal measurement duration and the preset time multiplier to obtain the third terminal measurement duration corresponding to the target subcarrier spacing.

3. A method for channel measurement, applied to a base station, the method comprising:
   configuring a received signal strength indicator (RS SI) measurement timing configuration (RMTC) parameter for a terminal, wherein the RMTC parameter comprises indication information of at least one subcarrier spacing and a terminal measurement duration corresponding to the indication information, wherein different indication information corresponds to different terminal measurement durations; and
   sending the RMTC parameter to the terminal to cause the terminal to determine a target terminal measurement duration corresponding to at least one target subcarrier spacing to be measured according to the indication information of the at least one subcarrier spacing and the terminal measurement duration corresponding to the indication information and to cause the terminal to perform channel measurement according to the target terminal measurement duration;

wherein when the base station causes the terminal to determine the target terminal measurement duration corresponding to the at least one target subcarrier spacing to be measured according to the indication information of the at least one subcarrier spacing and the terminal measurement duration corresponding to the indication information, the base station further causes the terminal to perform:

determining, in response to the RMTC parameter comprising indication information of any subcarrier spacing and a second terminal measurement duration corresponding to the indication information of the any subcarrier spacing, a preset target subcarrier spacing; and determining a third terminal measurement duration corresponding to the target subcarrier spacing according to the indication information of the any subcarrier spacing and the second terminal measurement duration corresponding to the indication information of the any subcarrier spacing, and determining the third terminal measurement duration as the target terminal measurement duration.

4. The method of claim 3, wherein sending the RMTC parameter to the terminal comprises:

sending radio resource control (RRC) signaling comprising the RMTC parameter to the terminal to cause the terminal to obtain the RMTC parameter from the RRC signaling.

5. A computing device, comprising:

one or more processors; and a non-transitory computer readable storage medium storing instructions executable by the one or more processors;

wherein the one or more processors are configured to:

receive a received signal strength indicator (RSSI) measurement timing configuration (RMTC) parameter sent by a base station, wherein the RMTC parameter comprises indication information of at least one subcarrier spacing and a terminal measurement duration corresponding to the indication information, wherein different indication information corresponds to different terminal measurement durations;

determine a target terminal measurement duration corresponding to at least one target subcarrier spacing to be measured according to the indication information of the at least one subcarrier spacing and the terminal measurement duration corresponding to the indication information; and perform channel measurement according to the target terminal measurement duration;

wherein the one or more processors are configured to determine, in response to the RMTC parameter comprising indication information of any subcarrier spacing and a second terminal measurement duration corresponding to the indication information of the any subcarrier spacing, a preset target subcarrier spacing, determine a third terminal measurement duration corresponding to the target subcarrier spacing according to the indication information of the any subcarrier spacing and the second terminal measurement duration corresponding to the indication information of the any subcarrier spacing and determine the third terminal measurement duration as the target terminal measurement duration.

6. The computing device of claim 5, wherein the one or more processors are configured to acquire a preset time multiplier, corresponding to the any subcarrier spacing, of the target subcarrier spacing according to the indication information of the any subcarrier spacing and multiply the second terminal measurement duration and the preset time multiplier to obtain the third terminal measurement duration corresponding to the target subcarrier spacing.

7. A computing device comprising:

one or more processors; and a non-transitory computer readable storage medium storing instructions executable by the one or more processors;

wherein the one or more processors are configured to:

configure a received signal strength indicator (RSSI) measurement timing configuration (RMTC) parameter for a terminal, wherein the RMTC parameter comprises indication information of at least one subcarrier spacing and a terminal measurement duration corresponding to the indication information, wherein different indication information corresponds to different terminal measurement durations; and send the RMTC parameter to the terminal to cause the terminal to determine a target terminal measurement duration corresponding to at least one target subcarrier spacing to be measured according to the indication information of the at least one subcarrier spacing and the terminal measurement duration corresponding to the indication information and to cause the terminal to perform channel measurement according to the target terminal measurement duration;

wherein the one or more processors are further configured to cause the terminal to determine, in response to the RMTC parameter comprising indication information of any subcarrier spacing and a second terminal measurement duration corresponding to the indication information of the any subcarrier spacing, a preset target subcarrier spacing, determine a third terminal measurement duration corresponding to the target subcarrier spacing according to the indication information of the any subcarrier spacing and the second terminal measurement duration corresponding to the indication information of the any subcarrier spacing and determine the third terminal measurement duration as the target terminal measurement duration.

8. The computing device of claim 7, wherein the one or more processors are configured to send radio resource control (RRC) signaling comprising the RMTC parameter to the terminal to cause the terminal to obtain the RMTC parameter from the RRC signaling.

* * * * *